United States Patent [19]
Okamoto et al.

[11] Patent Number: 5,994,819
[45] Date of Patent: Nov. 30, 1999

[54] DRIVING APPARATUS USING TRANSDUCER

[75] Inventors: Yasuhiro Okamoto, Tondabayashi; Ryuichi Yoshida, Sakai; Yoshitaka Sugimoto, Izumi, all of Japan

[73] Assignee: Minolta Co., Ltd., Osaka, Japan

[21] Appl. No.: 09/087,329

[22] Filed: May 29, 1998

[30] Foreign Application Priority Data

Jun. 2, 1997 [JP] Japan ..................................... 9-143989

[51] Int. Cl.⁶ .................................................. H02N 2/00
[52] U.S. Cl. ................ 310/328; 310/323.11; 310/323.17
[58] Field of Search .................................. 310/323, 328, 310/323.13, 323.03, 323.11, 323.15

[56] References Cited

U.S. PATENT DOCUMENTS

| | | | |
|---|---|---|---|
| 4,613,782 | 9/1986 | Mori et al. ............................... | 310/323 |
| 4,645,964 | 2/1987 | Hiramatsu et al. ....................... | 310/323 |
| 5,132,582 | 7/1992 | Hayashi et al. .......................... | 310/323 |
| 5,225,941 | 7/1993 | Saito et al. ............................... | 359/824 |
| 5,237,238 | 8/1993 | Berghaus et al. ........................ | 310/328 |
| 5,300,851 | 4/1994 | Nishikura et al. ....................... | 310/328 |
| 5,589,723 | 12/1996 | Yoshida et al. ......................... | 310/328 |
| 5,786,654 | 7/1998 | Yoshida et al. ......................... | 310/328 |

FOREIGN PATENT DOCUMENTS

| | | | |
|---|---|---|---|
| 0 747 977 | 12/1996 | European Pat. Off. ................ | 310/328 |
| 62-145309 | 6/1987 | Japan ...................................... | 310/328 |
| 636760 | 12/1978 | U.S.S.R. ................................. | 310/328 |

*Primary Examiner*—Thomas M. Dougherty
*Attorney, Agent, or Firm*—Sidley & Austin

[57] ABSTRACT

A driving apparatus having an electromechanical transducer which extends and contracts; a first member connected to one end of the electromechanical transducer; a driving frictional member which is formed of a ceramic material and is connected to the other end of the electromechanical transducer; and a second member frictionally coupled with the driving frictional member, whereby either one of the first or second object is fixed and the electromechanical transducer is made to extend and contract, thereby driving in a specified direction the member which is either the first or second member and is not fixed.

11 Claims, 4 Drawing Sheets

DRIVING APPARATUS USING TRANSDUCER

This application is based on application No. Hei 9-143989 filed in Japan, the content of which is hereby incorporated by reference.

BACKGROUND OF THE INVENTION

1. Field of the Invention

The present invention relates to a driving apparatus which uses a member for generating an extension/contraction displacement as a driving source. The present invention relates more particularly to a driving apparatus which uses an electromechanical transducer such as a piezoelectric element, and to a driving apparatus for use in accurately driving probes of, for example, an X-Y driving table, an image pickup lens of a camera, and a scan type tunneling electron microscope.

2. Description of the Related Art

Conventionally, a variety of types of driving apparatuses which use piezoelectric elements have been proposed.

Figures 1, 2:
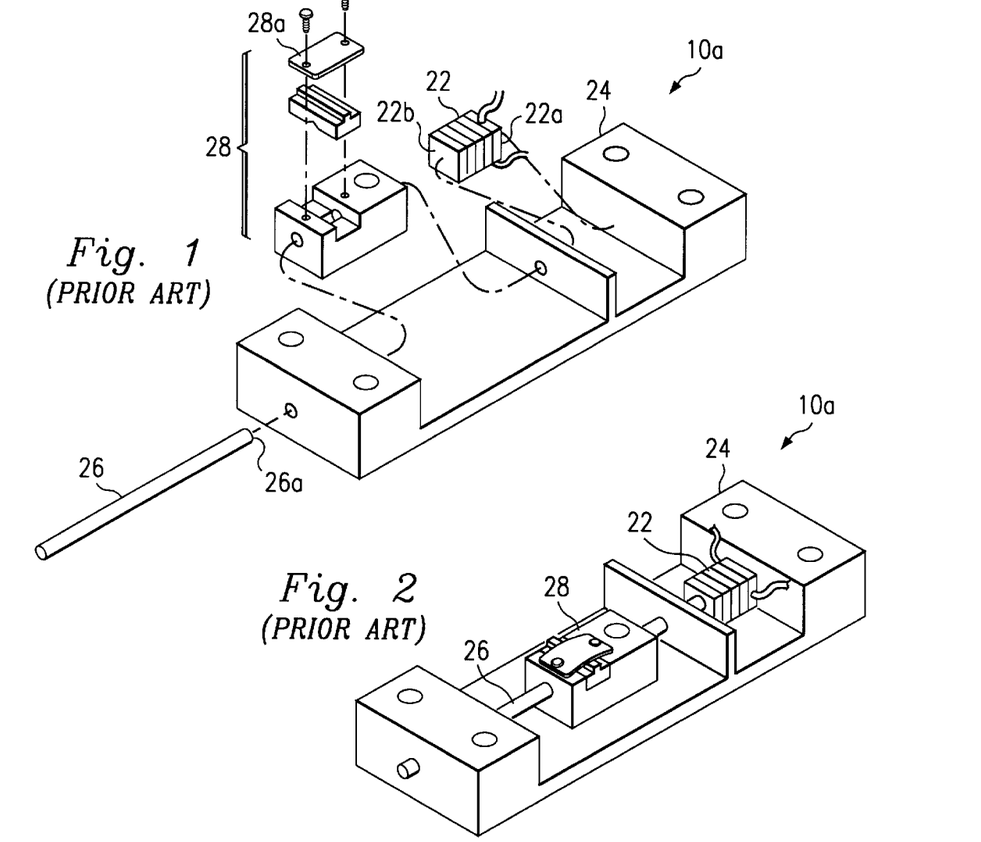
FIG. 1 is an exploded perspective view of a prior art linear movement type driving apparatus.
FIG. 2 is an overall perspective view of the driving apparatus shown in FIG. 1.

FIG. 1 is an exploded perspective view of a prior art linear movement type driving apparatus, while FIG. 2 is an overall perspective view of the driving apparatus shown in FIG. 1. A driving apparatus 10a is provided with a fixed member 24, a piezoelectric element 22, a driving shaft 26 slidably supported in its axial direction by the fixed member 24 and a driving unit 28 to be connected to a stage which moves with a driven member (not shown) of, for example, a component placed on it. The piezoelectric element 22 is a sort of electromechanical transducer, the length of which is varied by voltage application. The piezoelectric element 22 has one end surface 22a affixed to the fixed member 24 in the direction in which it extends or contracts and has the other end surface 22b affixed to one axial end surface 26a of the driving shaft 26 in the direction in which it extends or contracts. The driving unit 28 is provided with a leaf spring 28a, and the driving unit 28 is frictionally coupled with the driving shaft 26 by the urging force of this leaf spring 28a. In this driving apparatus 10a, the driving unit 28 is moved in a specified direction along the driving shaft 26 when the driving shaft 26 is vibrated in a reciprocating manner in the axial direction by applying to the piezoelectric element 22 a periodic pulse voltage having a sawtooth waveform, for example.

The driving shaft 26 of the driving apparatus 10a is required to have a high modulus of longitudinal elasticity and a high surface hardness on the frictional surface in the extension/contraction direction of the electromechanical transducer, or the piezoelectric element 22. The driving shaft 26 is also required to have a light weight and a smaller specific gravity for sufficient displacement of the piezoelectric element 22. In general, as for the characteristics of the driving frictional member, a modulus of longitudinal elasticity of not smaller than 8000 kg/mm$^2$ and a surface hardness of not smaller than 300 Hv are required under the practical driving conditions. Conventionally, in order to obtain the characteristics as described above, a carbon fiber composite resin in which carbon fibers are aligned in the extension/contraction direction of the piezoelectric element 22 has been used as the driving frictional member.

However, it is required to optimize the shape of the driving frictional member according to the type of the driving apparatus and the object to be driven. In the case of the carbon fiber composite resin in which carbon fibers are aligned in the extension/contraction direction of the piezoelectric element 22, when its cross-section shape is significantly changed in the middle as in, for example, a driving frictional member 26' shown in FIG. 3, it is difficult to obtain the required characteristic since the carbon fibers are cut or changed in density at the portion in which the cross-section shape is changed or other problems may also occur. That is, the driving frictional member using the carbon fiber composite resin has reduced freedom of shape.

Furthermore, in the driving apparatus 10a, the driving characteristics change depending on the mass of the object to be driven and the frictional force generated on the frictional surface. Therefore, the optimum frictional force has conventionally been obtained by repeating actual driving experiments while appropriately changing the coefficients of friction of the frictional surface, i.e., the surface roughness and the pressure force for each individual driving apparatus.

SUMMARY OF THE INVENTION

The first technical problem to be solved by the present invention is to provide a driving apparatus including a driving frictional member having a high degree of freedom of shape. The second technical problem to be solved by the present invention is to set the optimum frictional force without repeating the experiments of actually driving the driving apparatus.

In order to solve the aforementioned first technical problem, the present invention provides a driving apparatus comprising: an electromechanical transducer which extends and contracts according to electric charges applied by a driving pulse generating means; a first member connected to one end of the electromechanical transducer in the direction in which the transducer extends and contracts; a driving frictional member which is formed of a ceramic material and is connected to the other end of the electromechanical transducer in the direction in which the transducer extends and contracts; and a second member frictionally coupled with the driving frictional member, whereby either one of the first or second object is fixed and the electromechanical transducer is made to extend and contract by the driving pulse generating means, thereby driving in a specified direction the member which is either the first or second member and is not fixed.

In order to solve the aforementioned second technical problem, the present invention provides a driving apparatus comprising: an electromechanical transducer which extends and contracts according to electric charges applied by a driving pulse generating means; a first member connected to one end of the electromechanical transducer in the direction in which the transducer extends and contracts; a driving frictional member connected to the other end of the electromechanical transducer in the direction in which the transducer extends and contracts; and a second member frictionally coupled with the driving frictional member, whereby, assuming that the frictional force exerted between the driving frictional member and the second member is Ff and the generating force of the electromechanical transducer is Fp, the relation of Fp/15<Ff<Fp/5 is satisfied.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENT

A driving apparatus to which the present invention is applied will be described below with reference to the drawings.

Figures 3, 4:
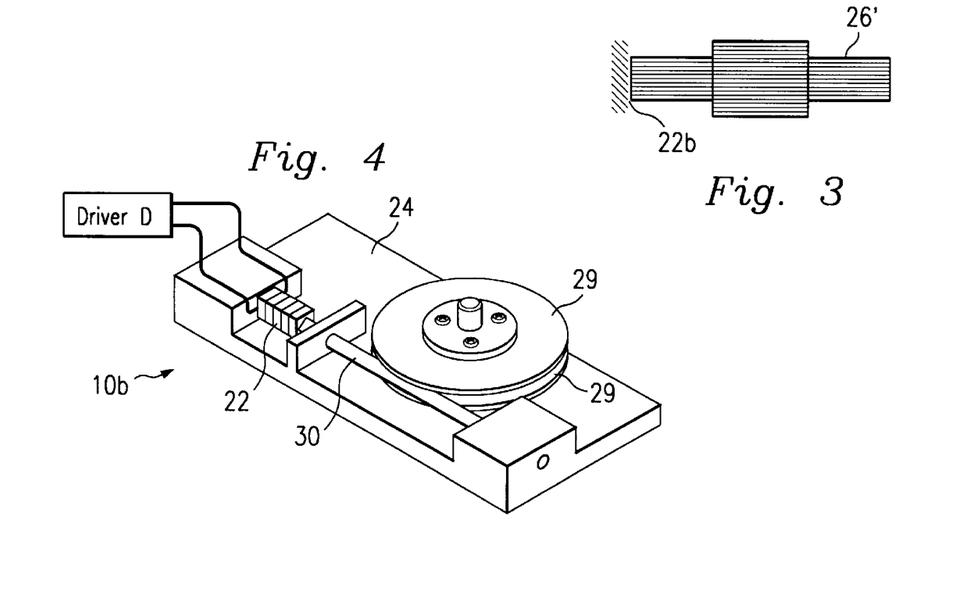
FIG. 3 is a side view of a driving frictional member.
FIG. 4 is a perspective view of a first rotary type driving apparatus of the present invention.

FIG. 4 is a perspective view of a first rotary type driving apparatus of the present invention, while FIG. 5 is a sectional view of a driving shaft to be used for the driving apparatus of FIG. 4.

In a driving apparatus lob, similar to the linear movement type shown in FIG. 1, one end of the piezoelectric element 22 is fixed by adhesion to the fixed member 24 and a driving shaft 30 is connected by adhesion to the other end of the piezoelectric element 22. A pair of disks 29 whose center portions are rotatably supported hold the driving shaft 30 in the vertical direction. In this case, by adjusting the interval between the pair of disks 29, the frictional force generated between the disks 29 and the driving shaft 30 is adjusted.

In this case, the driving shaft 30 is a hollow shaft made of a ceramic material and has a hole 30t opening only at the end surface on the side opposite from the adhesion surface 22b. By thus making the driving shaft 30 hollow, the shaft itself can be reduced in weight.

In this driving apparatus, similar to the driving apparatus disclosed in U.S. Pat. No. 5,589,723, a periodical pulse voltage having, for example, a sawtooth waveform is applied from a driver D to the piezoelectric element 22, thereby vibrating the driving shaft 30 in a reciprocating manner in the axial direction to rotatively drive the pair of disks 29. Specifically, when the piezoelectric element 22 is slowly displaced in a first direction, frictionally coupled portions of the disks 29 are displaced in the first direction by static friction between the driving shaft 30 and the disks 29, so that the disks 29 rotate in a specified direction. When the piezoelectric element 22 is rapidly displaced in a second direction, the inertial force of the disks 29 surpasses the frictional force between the driving shaft 30 and the disks 29 to generate a slip. The disks do not rotate in the direction opposite the specified direction, and only the driving shaft 30 returns to the original position. By repeating this operation, the disks 29 are rotatively driven in the specified direction.

Figure 6:
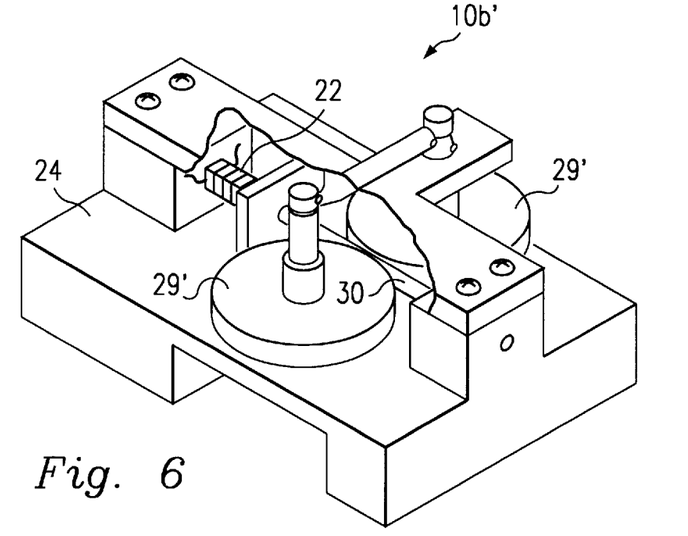
FIG. 6 is a perspective view of a second rotary type driving apparatus of the present invention.

FIG. 6 is a perspective view of a second rotary type driving apparatus of the present invention.

In a driving apparatus 10b', similar to the first rotary type shown in FIG. 4, one end of the piezoelectric element 22 is fixed by adhesion to the fixed member 24 and the driving shaft 30 is fixed by adhesion to the other end of the piezoelectric element 22. Then, a pair of rollers 29' whose center portions are rotatably supported hold the driving shaft 30 in the sidewise direction. In this case, by adjusting the interval between the pair of rollers 29', the frictional force generated between the rollers 29' and the driving shaft 30 is adjusted.

The rollers 29' are driven by giving a specified pulse voltage from the driver D similar to the first rotary type driving apparatus shown in FIG. 4.

It is to be noted that the aforementioned driving shaft 30 made of a ceramic material can also be used for the driving apparatus 10a of the linear movement type shown in FIG. 1 and FIG. 2.

Figure 7:
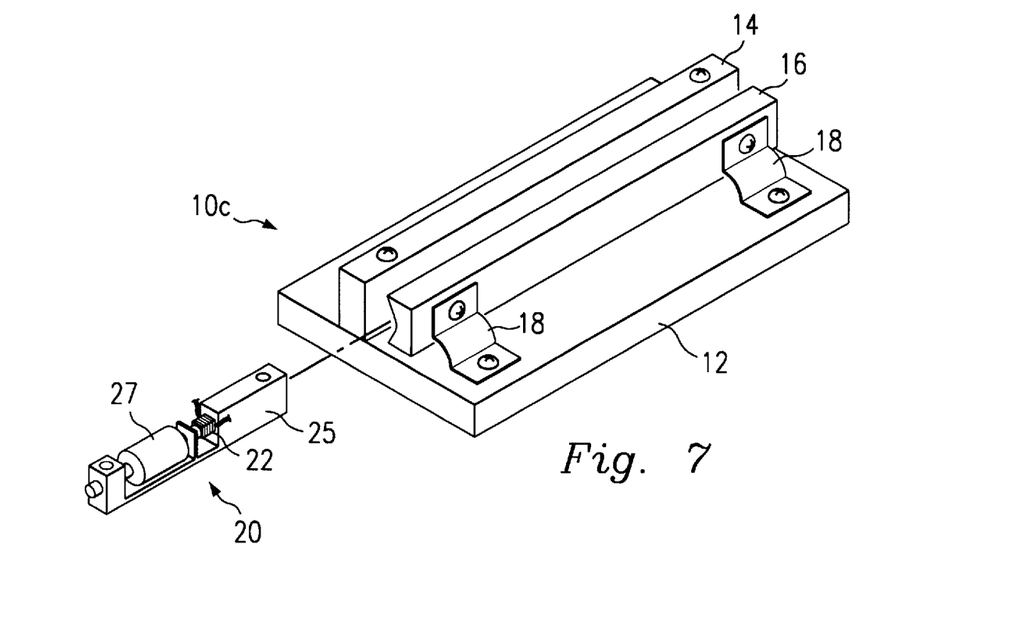
FIG. 7 is a perspective view of a self-propelled type driving apparatus of the present invention.
Figure 8:
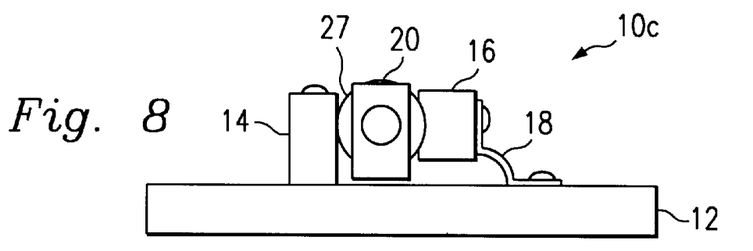
FIG. 8 is a front view of the driving apparatus shown in FIG. 7.
Figure 9:
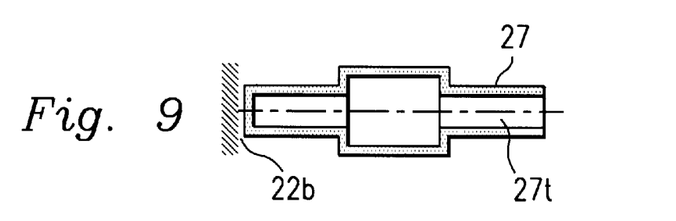
FIG. 9 is a sectional view of a driving shaft to be used for the driving apparatus shown in FIG. 7.

FIG. 7 is a perspective view of a self-propelled type driving apparatus of the present invention, while FIG. 8 is a front view of the driving apparatus shown in FIG. 7. In this case, the self-propelled type means that a driving unit 20 itself, including the piezoelectric element 22, moves. In a self-propelled type driving apparatus 10c, a first guide member 14 is fixed to a base 12, and a second guide member 16 arranged parallel to the first guide member 14 is supported in a state in which it is urged toward the first guide member 14 by a support spring 18. Connected to one end of the piezoelectric element 22 is a moving body 25 with a specified mass, and a driving shaft 27 with a mass smaller than that of the moving body 25 is affixed to the other end of the piezoelectric element 22, those members being integrated for the formation of the driving unit 20. The driving unit 20 is arranged between the first and second guide members 14 and 16, and the driving shaft 27 is frictionally coupled with the first and second guide members 14 and 16 while being held between them. FIG. 9 is a sectional view of the aforementioned driving shaft 27. The driving shaft 27 is a hollow shaft made of a ceramic material and has a hole 27t opening only at the end surface on the side opposite from the adhesion surface 22b. Being constructed of a ceramic material, this driving shaft 27 can meet the desired characteristics even if its cross-section is significantly changed.

In this driving apparatus 10c, the moving body 25 moves, while the driving shaft 27 remains unmoved when the piezoelectric element 22 is slowly displaced by the application of pulse voltage. When the piezoelectric element 22 is rapidly displaced, the driving shaft 27 slides with respect to the first and second guide members 14 and 16 while the moving body 25 remains unmoved, thereby driving the driving unit 20. By repeating this displacement of the piezoelectric element, the driving unit 20 moves and the other object to be driven connected to the driving unit 20 is driven.

In this case, when a ceramic material is used, the driving shaft, i.e., the driving frictional member is allowed to have a variety of shapes. The shapes are as follows:

A driving shaft 27a shown in FIG. 10 is comprised of a spherical frictional coupling section and a cylindrical support section.

Figure 11A:
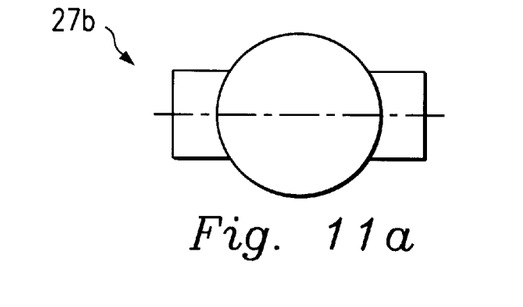
Figure 11B:
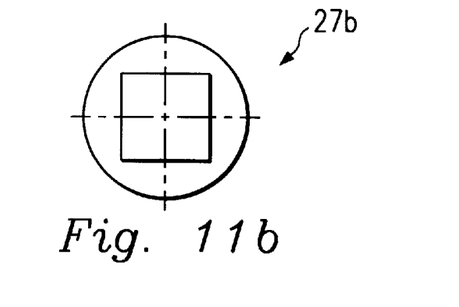

A driving shaft 27b shown in FIG. 11 is comprised of a spherical frictional coupling section and a prismatic support section.

Figure 12A:
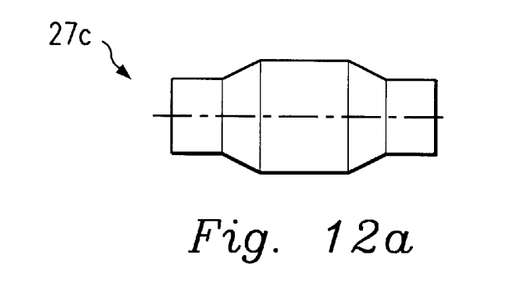
Figure 12B:
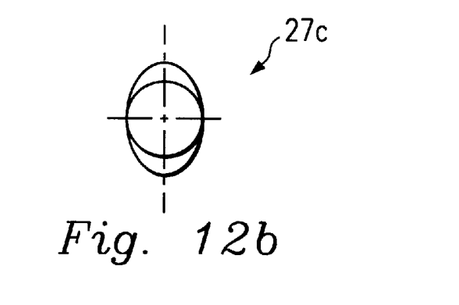
Figure 13A:
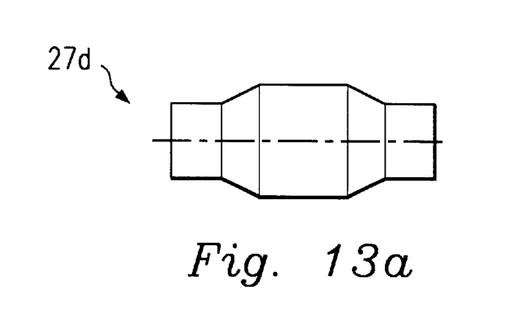
Figure 13B:
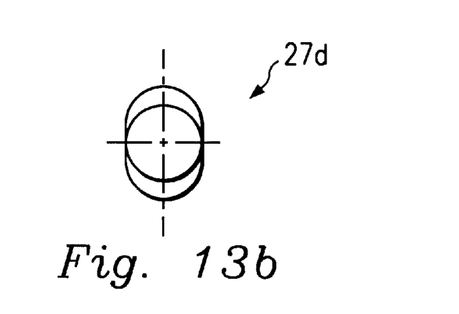

A driving shaft 27c shown in FIG. 12 and a driving shaft 27d shown in FIG. 13 are each comprised of a cylindrical frictional coupling section, a cylindrical support section which is thinner than the frictional coupling section and a connecting section for smoothly connecting the frictional coupling section and the support section.

As described above, the driving frictional member made of a ceramics material achieves a mass and a characteristic equivalent to those of the prior art driving frictional member made of a carbon fiber composite resin and is easily provided with a hollow hole or formed into a complicated cross-section shape. Furthermore, even if the cross-section is abruptly changed in the axial direction, there is no possibility of the disconnection of the carbon fibers or the reduction in characteristic as a result of a change in density as can occur in the carbon fiber composite resin. Furthermore, this obviates the need for a secondary processing by, for example, injection molding, thereby allowing low cost manufacturing.

Theoretically speaking, the driving apparatuses 10a, 10b, 10b' and 10c shown in FIG. 1, FIG. 4, FIG. 6 and FIG. 7 stop operating when the operating load exceeds the frictional force. However, experiments have proved that they stop operating when the operating load becomes approximately one-third to one half of the frictional force. When the frictional force is increased, the piezoelectric element has difficulty in moving the driving frictional member, and the driving speed reduces. When the frictional force is excessively reduced, the driving speed becomes difficult to stabilize.

Figure 14:
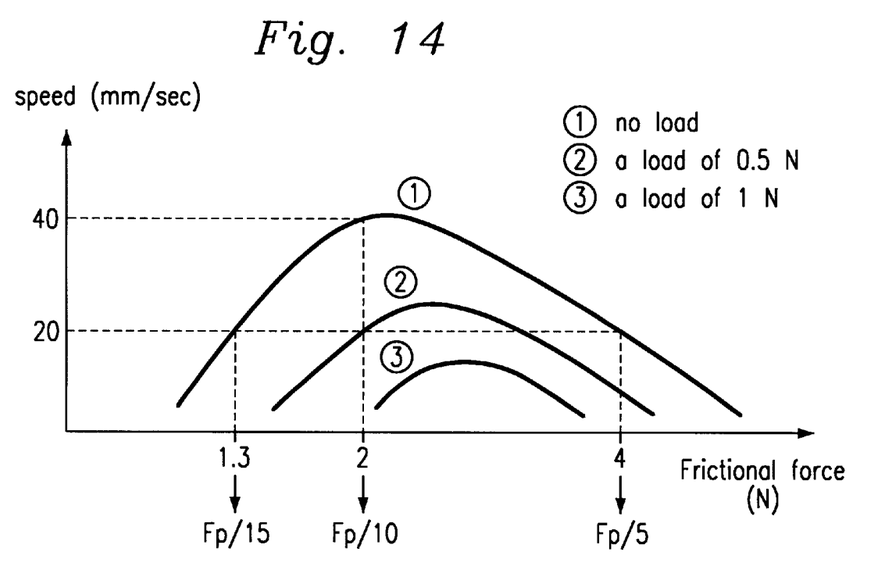
FIG. 14 is a graph showing the results of driving experiments.

Therefore, the driving speed was measured with the frictional force varying under three types of operating loads—① no load, ② a load of 0.5N and ③ a load of 1N—and the results of frictional-force-to-speed characteristics shown in FIG. 14 were obtained. For the experiments, the driving apparatus 10a of the type shown in FIG. 1 was used. The piezoelectric element 22 which was used and the driving conditions are as follows:

| Piezoelectric element | |
|---|---|
| Piezoelectric constant d33: | 640 × 10$^{-12}$ m/V |
| Elastic constant s33: | 20 × 10$^{-12}$ N/V |
| Cross-section area S: | 2.25 mm$^2$ |
| Single layer thickness d: | 110 µm |
| Number of laminates n: | 73 layers |
| Operating conditions | |
| Driving frequency: | 23.8 kHz |
| Voltage (p—p): | 30 V |
| Waveform: | |

The experiments shown in FIG. 14 produced the following facts. In the case of no load, assuming that the generating force of the piezoelectric element 22 is Fp, then Fp=19.6N under the aforementioned driving conditions. If the frictional force Ff between the driving shaft 26 and the driving unit 28 is Fp/15<Ff<Fp/5, then it can be found that a speed not slower than approximately half the maximum speed under each load condition can be produced. When a load is applied, it can be found that the proper setting should meet approximately Fp/10<Ff<Fp/5.

Fp can be theoretically obtained according to the following equation:

$$Fp=(d33 \cdot S \cdot V)/(s33 \cdot d)$$

In the above equation, d33 is the piezoelectric constant of the piezoelectric element 22; S is the cross-section area of the piezoelectric element 22; V is the voltage applied to the piezoelectric element 22; s33 is the elastic constant of the piezoelectric element 22; and d is the single layer thickness of the piezoelectric element.

Experiments were conducted to vary the generating force Fp by changing the voltage to be applied to the piezoelectric element 22, and similar results were obtained. Furthermore, with regard to the driving apparatuses 10b, 10b' and 10c of the other types such as the rotary type and self-propelled type, similar results were obtained.

According to the results of these experiments, the optimum frictional force Ff can be easily obtained. That is, the optimum frictional force Ff can be set by theoretically obtaining, for example, the generating force Fp of the piezoelectric element 22 from the shape of the piezoelectric element 22 according to the aforementioned equation, experimentally or theoretically obtaining the frictional force Ff between the driving shaft 26 and the driving unit 28 in the case where the roughness and the pressure force of the frictional surface between the driving shaft 26 and the driving unit 28 are varied in a variety of ways and satisfying Fp/15<Ff<Fp/5.

Therefore, the optimum frictional force can be set without repeating experiments of actually driving the driving apparatus 10a.

As described above, according to the present invention, the optimization of the driving frictional member to be executed individually in conformity to the type of the driving apparatus and the object to be driven can be made easily.

It is to be noted that the present invention is not limited to the aforementioned embodiments and is able to be implemented in the form of a variety of other embodiments. For example, it is a matter of course that an electromechanical transducer other than the piezoelectric element can be used.

What is claimed is:

1. A driving apparatus comprising:
   an electromechanical transducer which extends and contracts in a predetermined direction according to electric charges applied by a driving pulse;
   a first member connected to one end of said transducer in the predetermined direction in which said transducer extends and contracts;
   a driving frictional member which is formed of a ceramic material and is connected to the other end of said transducer in the predetermined direction in which said transducer extends and contracts; and
   a second member frictionally coupled with said driving frictional member.

2. A driving apparatus according to claim 1, wherein said first member is fixed and said second member is driven by repetitive extension and contraction of said transducer.

3. A driving apparatus according to claim 1, wherein said second member is fixed and said first member is driven by repetitive extension and contraction of said transducer.

4. A driving apparatus according to claim 1, wherein said driving frictional member is a hollow shaft.

5. A driving apparatus according to claim 4, wherein said driving frictional member has a hole at the end surface on the side opposite from said transducer.

6. A driving apparatus according to claim 1, wherein said driving frictional member is comprised of a unitary member formed of a spherical frictional coupling section and a cylindrical support section.

7. A driving apparatus according to claim 1, wherein said driving frictional member is comprised of a unitary member formed of a spherical frictional coupling section and a prismatic support section.

8. A driving apparatus according to claim 1, wherein said driving frictional member is comprised of a unitary member formed of a cylindrical frictional coupling section, a cylindrical support section which is thinner than the frictional coupling section and a connecting section for connecting the frictional coupling section and the support section.

9. A driving apparatus according to claim 1, whereby, assuming that the frictional force exerted between said driving frictional member and said second member is Ff and the generating force of said electromechanical transducer is Fp, the relation of Fp/15<Ff<Fp/5 is satisfied.

10. A driving apparatus comprising:

an electromechanical transducer which extends and contracts in a predetermined direction according to electric charges applied by a driving pulse;

a first member connected to one end of said transducer in the predetermined direction in which said transducer extends and contracts;

a driving frictional member connected to the other end of said transducer in the predetermined direction in which said transducer extends and contracts; and a second member frictionally coupled with said driving frictional member, whereby, assuming that the frictional force exerted between said driving frictional member and said second member is Ff and the generating force of said electromechanical transducer is Fp, the relation of Fp/15<Ff<Fp/5 is satisfied.

11. A method to drive a driving apparatus having an electromechanical transducer which extends and contracts in a predetermined direction, a first member connected to one end of said transducer in the predetermined direction, a driving frictional member connected to the other end of said transducer in the predetermined direction and a second member frictionally coupled with said driving frictional member, the method comprising step of:

adjusting the frictional force exerted between said driving frictional member and said second member, wherein said frictional force is Ff and the generating force of said electromechanical transducer is Fp, the relation of Fp/15<Ff<Fp/5 is satisfied.

* * * * *

UNITED STATES PATENT AND TRADEMARK OFFICE
CERTIFICATE OF CORRECTION

PATENT NO.   : 5,994,819
DATED        : November 30, 1999
INVENTOR(S)  : Yasuhiro Okamoto et al.

It is certified that error appears in the above-identified patent and that said Letters Patent is hereby corrected as shown below:

Title page,
[75], Inventors:, the first line, after "Okamoto", delete "Tondabayashi" and insert -- Tondabayashi-Shi --.

Title page,
[75], Inventors: , the second line, after "Yoshida", delete "Sakai" and insert -- Sakai-Shi --.

Title page,
[75], Inventors, the third line, after "Sugimoto", delete "Izumi" and insert -- Izumi-Shi --.

Column 2,
Line 39, delete "object" and insert -- member --.

Figure 5A:
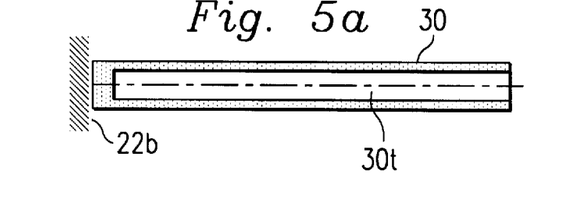
FIG. 5 is a sectional view of a driving shaft to be used for the driving apparatus of the present invention.
Figure 5B:
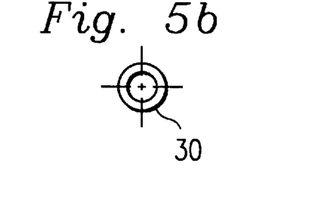

Column 3,
Line 9, delete "FIG. 5 is a sectional view" and insert -- Figures 5a and 5b are a sectional view and end view --.
Line 20, delete "FIGS. 10, 11, 12, and 13" and insert -- Figs. 10a, 10b, 11a, 11b, 12a, 12b, 13a and 13b --.
Line 32, delete "while FIG. 5 is" and insert -- while Fig. 5a is --.

UNITED STATES PATENT AND TRADEMARK OFFICE
CERTIFICATE OF CORRECTION

PATENT NO. : 5,994,819
DATED : November 30, 1999
INVENTOR(S) : Yasuhiro Okamoto et al It is certified that error appears in the above-identified patent and that said Letters Patent is hereby corrected as shown below:

Column 3,
Line 33, after "driving shaft" insert -- and Fig 5b as an end view of the driving shaft --.

Figure 10A:
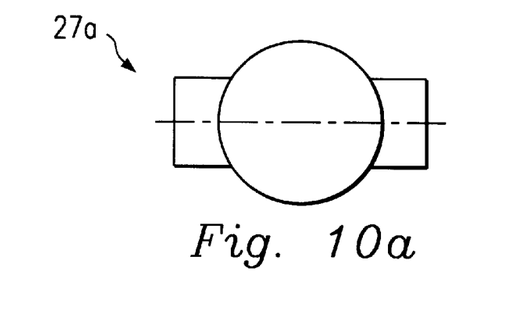
FIGS. 10, 11, 12 and 13 are diagrams showing the shapes of modification examples of the driving shaft.
Figure 10B:
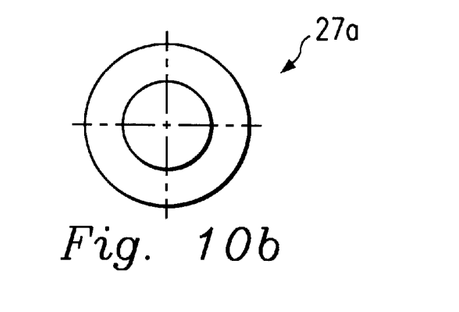

Column 4,
Line 60, delete "FIG. 10" and insert -- Figs. 10a and 10b --.
Line 63, delete "FIG. 11" and insert -- Figs. 11a and 11b --.
Line 66, delete "FIG. 12" and insert -- Figs. 12a and 12b --.
Line 67, delete "FIG. 13" and insert -- Figs. 13a and 13b --.

Column 5,
Line 9, delete "hollow".

Column 8, claim 11,
Line 17, delete "Ff and the" and insert -- Ff, the --.
Line 18, delete "Fp, the" and insert -- Fp, and the --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*